United States Patent
Gronstad et al.

(10) Patent No.: US 12,101,641 B2
(45) Date of Patent: *Sep. 24, 2024

(54) ASYMMETRIC DYNAMIC SPECTRUM SHARING

(71) Applicant: T-Mobile USA, Inc., Bellevue, WA (US)

(72) Inventors: Egil Gronstad, Encinitas, CA (US); Dinesh Kumar, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/131,123

(22) Filed: Apr. 5, 2023

(65) Prior Publication Data
US 2023/0239705 A1     Jul. 27, 2023

Related U.S. Application Data

(63) Continuation of application No. 17/193,264, filed on Mar. 5, 2021, now Pat. No. 11,627,470.

(60) Provisional application No. 62/986,103, filed on Mar. 6, 2020.

(51) Int. Cl.
*H04W 16/14* (2009.01)
*H04W 8/24* (2009.01)
*H04W 16/10* (2009.01)

(52) U.S. Cl.
CPC ........... *H04W 16/14* (2013.01); *H04W 8/24* (2013.01); *H04W 16/10* (2013.01)

(58) Field of Classification Search
CPC ..... H04W 72/51; H04W 88/06; H04W 72/04; H04W 88/10; H04W 48/18; H04W 16/32; H04W 72/0453; H04W 76/16; H04W 8/24; H04B 7/0626; H04B 7/043
See application file for complete search history.

(56) References Cited

U.S. PATENT DOCUMENTS

| | | | |
|---|---|---|---|
| 2010/0238868 A1 | 9/2010 | Melpignano et al. | |
| 2017/0367058 A1* | 12/2017 | Pelletier | H04W 52/246 |
| 2018/0014287 A1* | 1/2018 | Papasakellariou | H04W 76/20 |
| 2019/0089498 A1 | 3/2019 | Pelletier et al. | |
| 2019/0141770 A1* | 5/2019 | Takahashi | H04W 72/51 |
| 2020/0021409 A1 | 1/2020 | Kumar et al. | |
| 2020/0337054 A1 | 10/2020 | Kwok et al. | |

(Continued)

FOREIGN PATENT DOCUMENTS

WO    WO2020226644 A1    11/2020

OTHER PUBLICATIONS

Office Action for U.S. Appl. No. 17/193,264, mailed on Aug. 15, 2022, Gronstad, "Asymmetric Dynamic Spectrum Sharing", 7 pages.

*Primary Examiner* — Congvan Tran
(74) *Attorney, Agent, or Firm* — Lee & Hayes, P.C.

(57) ABSTRACT

Techniques for asymmetric dynamic spectrum sharing are discussed herein. A first portion of spectrum can share spectrum between Long Term Evolution (LTE) and New Radio (NR) radio access technologies (RATs). A second portion of spectrum can be allocated to a particular RAT without sharing. Thus, control signals associated with both RATs can be associated with the shared portion. However, for the portion not shared, control signals for the particular RAT (e.g., NR) can be used without the control signals from the other RAT (e.g., LTE), thereby increasing capacity in the portion not shared.

20 Claims, 6 Drawing Sheets

(56) References Cited

U.S. PATENT DOCUMENTS

| | | |
|---|---|---|
| 2020/0351987 A1 | 11/2020 | Gheorghiu et al. |
| 2020/0366440 A1 | 11/2020 | Tsai et al. |
| 2021/0282104 A1* | 9/2021 | Sagar .................... H04W 76/16 |
| 2021/0392649 A1 | 12/2021 | Kim et al. |
| 2022/0353876 A1* | 11/2022 | Cimpu .................. H04L 5/0035 |

* cited by examiner

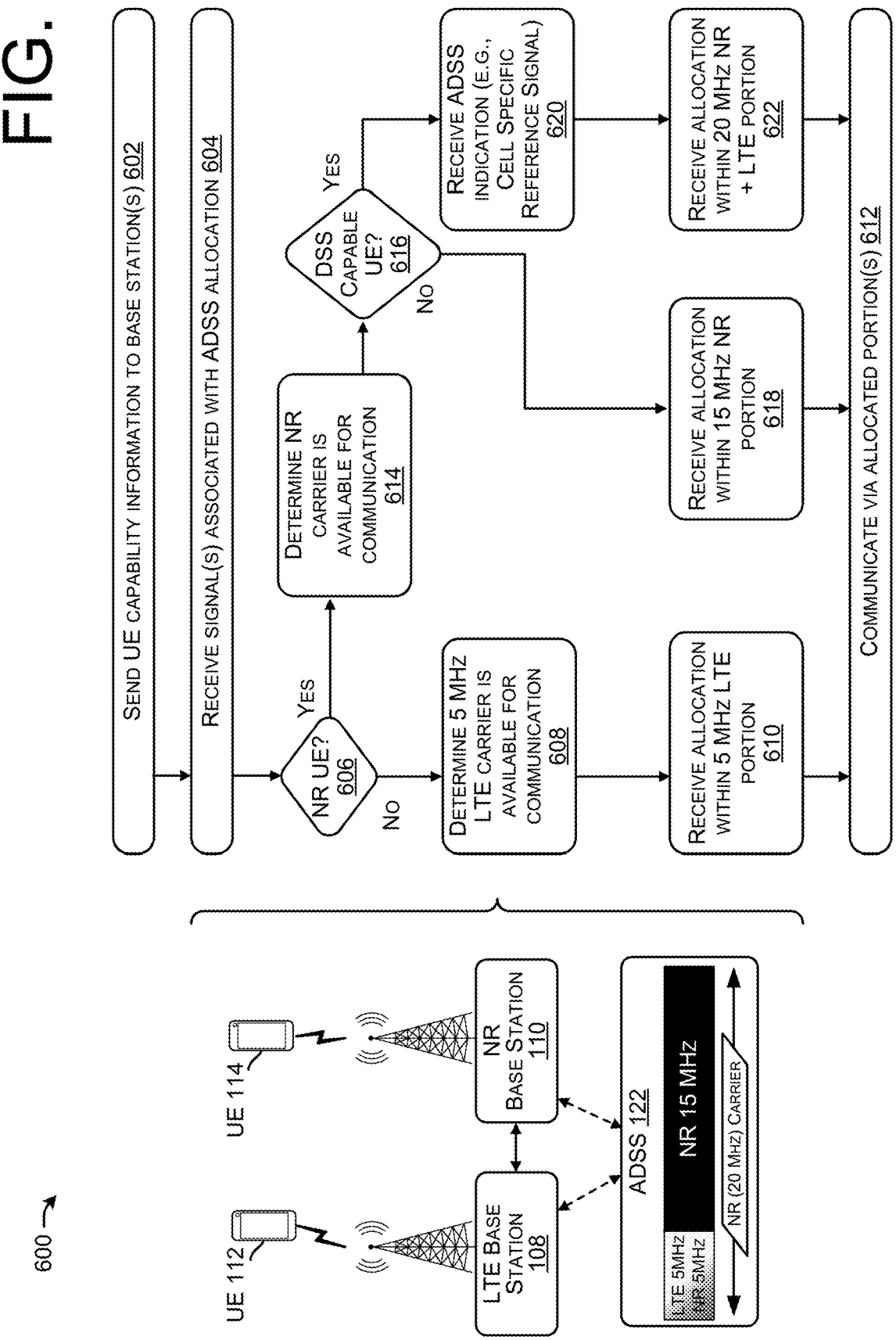

ASYMMETRIC DYNAMIC SPECTRUM SHARING

CROSS-REFERENCE TO RELATED APPLICATIONS

This is a continuation application which claims priority to commonly assigned, co-pending U.S. patent application Ser. No. 17/193,264, filed Mar. 5, 2021, which claims priority to U.S. Provisional Patent Application No. 62/986,103 entitled "Asymmetric Dynamic Spectrum Sharing," filed Mar. 6, 2020. Application Ser. Nos. 17/193,264 and 62/986,103 are fully incorporated herein by reference.

BACKGROUND

Cellular communication devices use network radio access technologies to communicate wirelessly with geographically distributed cellular base stations. Long-Term Evolution (LTE) is an example of a widely implemented radio access technology that is used in $4^{th}$ Generation (4G) communication systems. New Radio (NR) is a newer radio access technology that is used in $5^{th}$ Generation (5G) communication systems. Standards for LTE and NR radio access technologies have been developed by the 3rd Generation Partnership Project (3GPP) for use by wireless communication carriers.

In some cases, a network may facilitate communications with a first mobile device capable of using a 4G radio access technology (RAT) and a second mobile device capable of using a 5G RAT. In such cases, the network may allocate a portion of spectrum to facilitate such 4G communications and 5G communications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates another example process for asymmetric dynamic spectrum sharing, as described herein.

DETAILED DESCRIPTION

Figure 1:
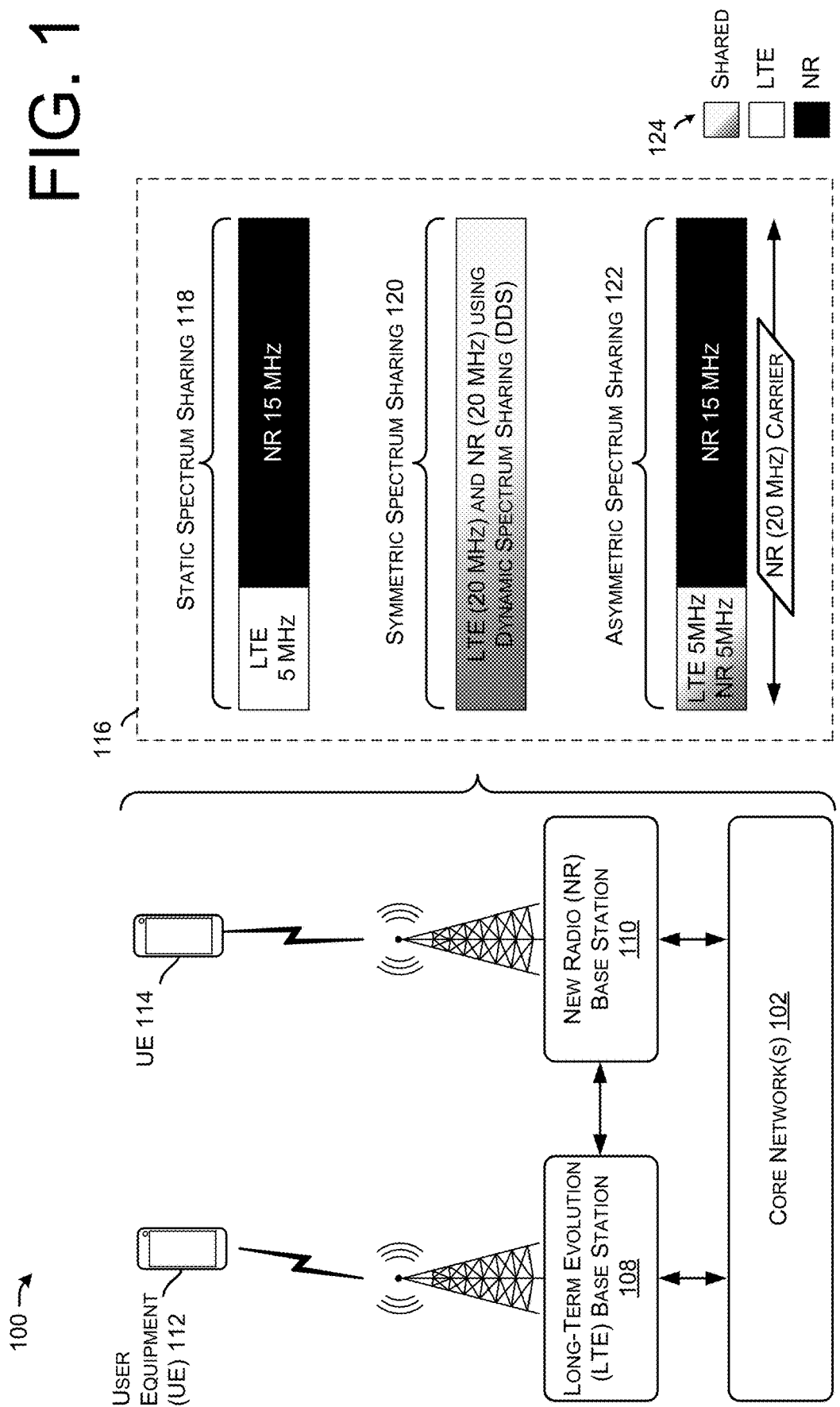
FIG. 1 illustrates an example environment including user equipment and various components implementing asymmetric dynamic spectrum sharing, as described herein.

The systems, devices, and techniques described herein are directed to asymmetric dynamic spectrum sharing in a wireless network. In some instances, the wireless networks may include a first base station (e.g., a Long-Term Evolution (LTE) base station) that may operate in conjunction with a second base station (e.g., a New Radio (NR) base station) to provide connectivity to user equipment (UE) operating in that environment. A scheduling component can allocate a portion of wireless resources to an LTE radio access technology (RAT) or a NR RAT. The allocated spectrum may be dynamically allocated based on traffic requirements, capabilities of UEs, radio conditions, and the like. The allocated spectrum may be asymmetric such that a first portion of spectrum shared between LTE and NR may not represent equal portions of a frequency spectrum.

In some cases, dynamic spectrum sharing (DSS) can be used in connection with 5G implementations to allow both 5G and 4G UEs to share the same spectrum. In conventional applications of dynamic spectrum sharing, the same amount of spectrum is shared both by LTE and NR, such that there may be a symmetry in the amount of spectrum shared by LTE and NR. For example, if an environment has 10 MHz of spectrum, the same 10 MHz is shared both by LTE and NR in symmetric dynamic spectrum sharing (SDSS).

With asymmetric dynamic spectrum sharing (ADSS), only a portion of the spectrum is shared. Returning to the previous example considering a 10 MHz portion of spectrum, an ADSS implementation will include a 10 MHz NR carrier, while an LTE signal may be defined (e.g., limited) for a 5 MHz portion, such that spectrum sharing happens only within this 5 MHz block.

In some cases, ADSS limits the portion of spectrum where sharing happens by explicitly signaling to the UE the amount of physical resource block (PRBs) or the frequency portion where sharing happens. Spectrum sharing may be implemented using a 3GPP standardized feature called a CRS (Cell specific reference signal) rate matching.

In some cases, one drawback of spectrum sharing may be that sharing between LTE and NR may bring an increase of pilot signals and other control channels from both the technologies to the shared spectrum, which in turn reduces the bandwidth available for a data channel. In some cases, NR (less than 10% overhead) is a leaner carrier compared to LTE (~30% overhead), which is to say that NR may use fewer control channels resulting in less overhead compared to LTE. However, sharing spectrum, while improving flexibility to use a portion of spectrum with 4G capable UEs and 5G capable UEs, may limit NR performance. Implementations of ADSS can limit the control channel overhead from LTE to a smaller portion of the spectrum, thereby giving more capacity to NR users and the cell.

In some cases, legacy UEs associated with a network may be limited in a capability to use a RAT for a particular portion of spectrum. For example, a legacy UE may be capable of using 4G in a first portion of a spectrum but not capable of using 4G in a second portion of a spectrum. In some cases, ADSS can be used to provide spectrum based on capabilities of UEs in an environment.

In some cases, portions of spectrum can be allocated in an ADSS context based on one or more of historical UE capability data, heuristic(s), machine-learned model, bandwidth metric(s), handover metric(s), and the like. For example, historical UE capability data may be indicative of how many UEs have been located with a particular geographical area (e.g., providing capability information) indicative of whether the UE supports 4G/5G, DSS, ADSS, and the like. In some examples, the heuristic(s) can include threshold(s) or levels indicating a size of portion(s) of spectrum to allocate to 4G/5G/DSS/ADSS based on the number of UEs with specific data. In some examples, a machine-learned model can learn an optimal size of portions to allocate to 4G/5G/DSS/ADSS based on optimizing throughput, QoS, QoE, reducing handovers or signaling, and the like. In some examples, a bandwidth metric may be indicative of an actual or expected bandwidth of UEs associated with particular capability information. In some cases, a handover metric may be indicative of actual or expected handovers from 5G to 4G (or vice versa), which may be indicative of an actual amount or estimated amount of handovers to expect based on UEs actual or expected UEs with particular UE capabilities.

One implementation can include using ADSS to provide NR over a 20 MHz portion and provide LTE over a 15 MHz subset of the 20 MHz portion. In this use case, legacy LTE UE's may not support that last 5 MHz portion, so LTE carrier bandwidth may be limited to 15 MHz. Using ADSS in this example may represent efficiency gains compared to an implementation where symmetric DSS is used for a 15 MHz portion spectrum and a 5 MHz portion is allocated to NR such that a UE capable of NR communications may perform carrier aggregation across the 15 MHz NR/LTE DSS spectrum and the 5 MHz NR portion. Further, using ADSS may reduce signaling in the core network to further improve efficiency. Further, some UEs may be limited by the number of carrier aggregation combinations that can be handled simultaneously (e.g., limited to aggregate across 2, 3 4, or N number of frequency blocks). Using ADSS may obviate the need to perform carrier aggregation over a particular portion of spectrum, which may increase an ability of the UE to use carrier aggregation in other portions of spectrum, effectively increasing a bandwidth available to a UE.

In some examples, dynamic spectrum sharing may reduce the NR Physical downlink control channel (PDCCH) capacity by 60% compared to a clean NR carrier that doesn't do spectrum sharing. PDCCH is used to send downlink information to a UE, which may use information in the PDCCH to identify data location and how to decode a data channel.

In some implementations of symmetric dynamic spectrum sharing (SDSS) network configuration, LTE may receive 66% of PDCCH capacity while NR may receive 33% capacity. However, implementations of ADSS can open up more capacity for NR PDCCH by using frequency division multiplexing of PDCCH and using 100% of PDCCH symbols in the non-shared portion of the spectrum. This may improve NR-PDCCH capacity for services like Voice over NR which often need more PDCCH capacity.

Further, some existing network implementations may not allow a 5 MHz spectrum block to be used with SDSS. For example, using SDSS in a 5 MHz block may not provide enough NR PDCCH capacity for critical services like VoNR. With ADSS, NR-PDCCH capacity can increase substantially depending upon the configuration, thereby providing more flexibility for relatively small (e.g., 5 MHz blocks) block of spectrum.

The systems, devices, and techniques described herein can be implemented in a number of ways. In general, the techniques discussed herein may be implemented in any multi-RAT environment, and are not limited to 2G, 3G, 4G, and/or 5G environments. In some examples the techniques can be used in license assisted access (LAA) contexts. In some instances, a core network can be represented as a 4G core network and/or a 5G core network. In some instances, the techniques can be implemented in standalone implementations (e.g., Option 1 and/or 2, as referred to by 3GPP) or in non-standalone implementations such as those referred to as Option 3, 4, 7, etc. by 3GPP. Example implementations are provided below with reference to the following figures.

FIG. 1 illustrates an example environment including user equipment and various components implementing spectrum sharing (including asymmetric spectrum sharing spectrum), as described herein.

For purposes of discussion, a 4G or LTE component is a component that performs according to 4G or LTE communications standards. A 4G or LTE signal or communication is a signal or communication that accords with 4G or LTE communications standards. A 5G or NR component is a component that performs according to 5G or NR communications standards. A 5G or NR signal or communication is a signal or communication that accords with 5G or NR communications standards. Although often discussed in the context of 4G and 5G environments, the techniques discussed herein may be implemented in any dual connectivity, multi connectivity, or multiple bearer environment.

The network 100 includes core network(s) 102. In some examples, the core network 102 may include a 4G core network including a Mobility Management Entity (MME), a Serving Gateway (SGW), a Packet Data Network (PDN) Gateway (PGW), a Home Subscriber Server (HSS), an Access Network Discovery and Selection Function (ANDSF), an evolved Packet Data Gateway (ePDG), a Data Network (DN), and the like.

In some examples, the core network 102 can include a 5G core network. For instance, the core network 102 may include any of an Access and Mobility management Function (AMF), a Session Management Function (SMF), a Policy Control Function (PCF), an Application Function (AF), an Authentication Server Function (AUSF), a Network Slice Selection Function (NSSF), a Unified Data Management (UDM), a Network Exposure Function (NEF), a Network Repository Function (NRF), a User Plane Function (UPF), a DN and the like.

FIG. 1 also shows a 4G LTE base station 108, a 5G NR base station 110, and user equipment (UE) 112 and 114.

The terms "user equipment (UE)," "user device," "user devices," "wireless communication device," "wireless device," "communication device," "mobile device," and "client device," can be used interchangeably to describe any UE (e.g., the UE 112 the UE 114) that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology.

Examples of UEs (e.g., the UE 112 and/or the UE 114) can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

Any of the UEs 112 and 114 may be capable of supporting 4G radio communications, such as LTE radio communications, and/or 5G radio communications, such as New Radio (NR) communications. In some examples, either or both of UEs 112 and 114 may be configured to support at least one of enhanced Mobile Broadband (eMBB) communications, Ultra Reliable Low Latency Communications (URLLCs), or massive Machine Type Communications (mMTCs). In some instances, the one or more devices can include at least one device supporting one or more of a sensor network, voice services, smart city cameras, gigabytes-in-a-second communications, 3D video, 4K screens, work & play in the cloud, augmented reality, industrial and/or vehicular automation, mission critical broadband, or self-driving cars.

In some cases, the LTE base station 108, the NR base station 110, the core network(s) 102, and/or another component can include a scheduling component that can allocate portions of spectrum to one or both of various radio access technologies (RATs). Examples of spectrum sharing are illustrated as example 116. In some examples, spectrum can be allocated based at least in part on one or more of expected, real-time, or near real-time information about network resources, load levels, UE capabilities (e.g., 4G capable, 4G/5G capable, DSS capable, etc.), bandwidth demands or metrics, bearer assignments, handover metrics, and the like.

In some examples, spectrum can be allocated based at least in part on network information that can include, but is not limited to: load information (e.g., a number of connections, available/expected bandwidth, delay, queue size, jitter, etc. of the base station 108 and/or 110); beamforming information (e.g., indicative of individual beamforming lobe(s) associated with various UEs (e.g., indicative of location information)); profile information (e.g., a user profile based on an International Mobile Equipment Identity (IMEI), for example, received from various UEs, indicative of a subscriber level associated with UEs); attach status (e.g., a history of any successful/unsuccessful connections with the base stations 108 and/or 110, or others); bearer type (e.g., indicative of a bearer type assigned to the UEs); aggregated information (e.g., network information from a plurality of UEs that have been aggregated or otherwise combined); and the like.

In some examples, spectrum can be allocated based at least in part on one or more of UE location information (e.g., GPS information, a beamforming lobe from the base station 108 associated with the communication 222, etc.); signal information (e.g., a strength of the signal from the base stations 108 and/or 110, such as a downlink signal strength such as a received signal strength indication (RSSI), reference signal received power (RSRP), reference signal received quality (RSRQ), signal-to-interference-plus-noise ratio (SINR), etc.); attach status (e.g., a history of any successful/unsuccessful connections with the base stations 108 and/or 110, such as one or more failed addition requests, or others); handover metrics (e.g., a history/estimate of handovers from one RAT to another RAT, such as fallback from 5G to 4G, and the like); traffic type (e.g., QCI, application type, voice or data traffic, latency requirements, bandwidth requirements, etc.); bearer type; capability information (e.g., whether a UE 202 is capable of ADSS, and/or whether the UE is capable of communicating via the 5G protocol, etc.); and the like.

The example 116 illustrates static spectrum sharing 118, symmetric spectrum sharing 120 (also referred to as SDSS or DSS), and asymmetric spectrum sharing 122 (also referred to as ADSS).

A legend 124 illustrates the distinctions between portions of spectrum shared, allocated to LTE, or allocated to NR.

In some cases, the static spectrum sharing 118 may represent a first portion of spectrum (e.g., 5 MHz) that is statically allocated to LTE UEs and a second portion of spectrum (e.g., 15 MHz) that is statically allocated to NR UEs. In some cases, the first and second portions may be adjacent.

In some cases, the symmetric spectrum sharing 120 may represent spectrum sharing for both LTE and NR across the same 20 MHz portion of spectrum.

In some cases, the asymmetric spectrum sharing 122 may represent spectrum sharing between LTE and NR for a first portion of spectrum (e.g. 5 MHz) and no spectrum sharing for a second portion of spectrum (e.g., 15 MHz). In all cases, the first and second portions are adjacent. In some cases, the NR carrier may span 20 MHz block or more.

In some cases, ADSS may limit capacity loss caused by LTE control channels by limiting LTE to a smaller portion of a block.

In some cases, ADSS may increase NR PDCCH capacity. In some cases, ADSS may be used in conjunction with blocks of spectrum that may be too small for SDSS. In some instances, limiting LTE spectrum may reduce an amount of baseband processing in the base station (e.g., 108 and/or 110) or in the core network 102.

Of course, any number and size of spectrum portions are considered herein. In some examples, more than two RATs may be used in the context of this disclosure.

The LTE base station 108 and the NR base station 110 may in some cases be associated with each other by being co-located at a single cell site. Although only a single pair of base stations is shown in FIG. 1, the network 100 may include multiple cell sites, some of which might have both an LTE base station and an NR base station. In some instances, at least a portion of a geographic coverage area associated with the LTE base station 108 can overlap with a geographic coverage area associated with the NR base station 110.

Figure 2:
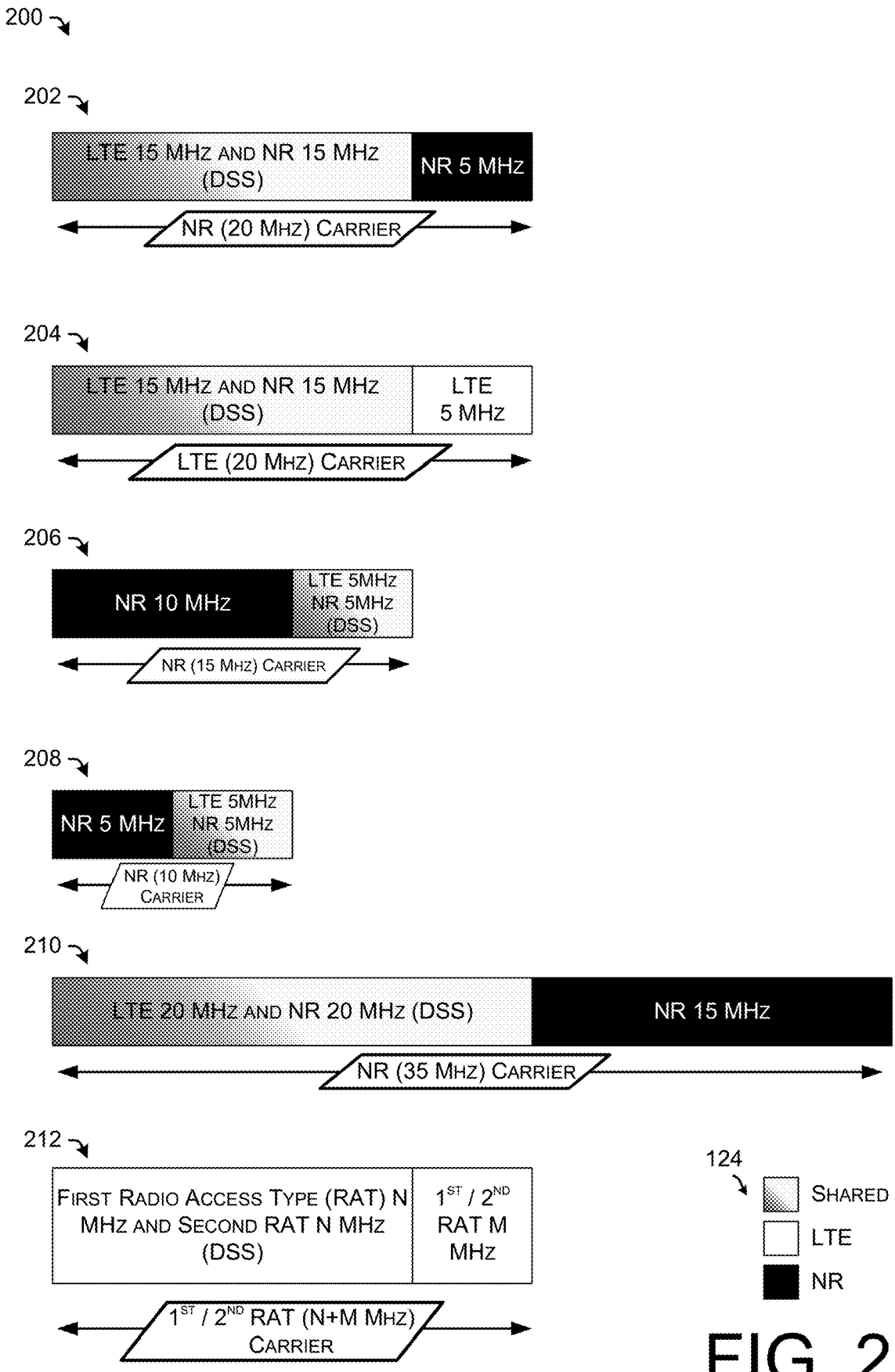
FIG. 2 illustrates example implementations of asymmetric dynamic spectrum, as described herein.

FIG. 2 illustrates example implementations 200 of asymmetric dynamic spectrum, as described herein.

An example 202 illustrates a case where DSS is used between LTE and NR over a 15 MHz portion of spectrum while NR only is used for a 5 MHz portion of spectrum.

In some cases, the example 202 may use a 20 MHz NR carrier.

An example 204 illustrates a case where DSS is used between LTE and NR over a 15 MHz portion of spectrum while LTE only is used for a 5 MHz portion of spectrum.

In some cases, the example 204 may use a 20 MHz LTE carrier.

An example 206 illustrates a case where DSS is used between LTE and NR over a 5 MHz portion of spectrum while NR only is used for a 10 MHz portion of spectrum.

In some cases, the example 206 may use a 15 MHz NR carrier.

An example 208 illustrates a case where DSS is used between LTE and NR over a 5 MHz portion of spectrum while NR only is used for a 5 MHz portion of spectrum.

In some cases, the example 208 may use a 10 MHz NR carrier.

An example 210 illustrates a case where DSS is used between LTE and NR over a 20 MHz portion of spectrum while NR is used for a 15 MHz portion of spectrum.

In some cases, the example 210 may use a 35 MHz NR carrier.

In some cases, the spectrum allocated in the example 210 (or any of the examples discussed herein) may not include a guard band between the portion allocated for DSS and the portion allocated for a single radio access technology. That is, in the example 210, there may not be a guard band between the 20 MHz portion of spectrum where DSS is used for LTE and NR and the 15 MHz portion where NR is used exclusively.

An example 212 illustrates a case where DSS is used between a first radio access technology (RAT) and a second RAT over a N MHz portion of spectrum while one of the first RAT or the second RAT is used for a M MHz portion of spectrum.

In some cases, the example 212 may use an N+M MHz carrier associated with either of the first or second RAT used for the M MHz portion of spectrum.

That is, the example 212 illustrates the flexible implementation of the ADSS techniques discussed herein that are not limited to particular block sizes or configurations of RATs. For example, for a portion of spectrum associated with a "clean" carrier (e.g., a portion of spectrum associated with one RAT (e.g., NR or LTE)), the size of the portion may be any size (e.g., 1 MHz, 5 MHz, 10 MHz, 15 MHz, 20 MHz, etc.) and is not limited to the specific examples discussed herein. Further, for a portion of spectrum where DSS is enabled (e.g., dynamic spectrum sharing enabled between at least a first RAT and a second RAT), a size of that portion may be any size, and is not limited to the specific examples discussed herein.

Further, allocations may include a first portion associated with a first RAT (and clean carrier), a second portion associated with DSS (e.g., the first RAT and a second RAT), a third portion associated with a third RAT (and clean carrier), and the like. Additional configurations contemplated herein.

Figure 3:
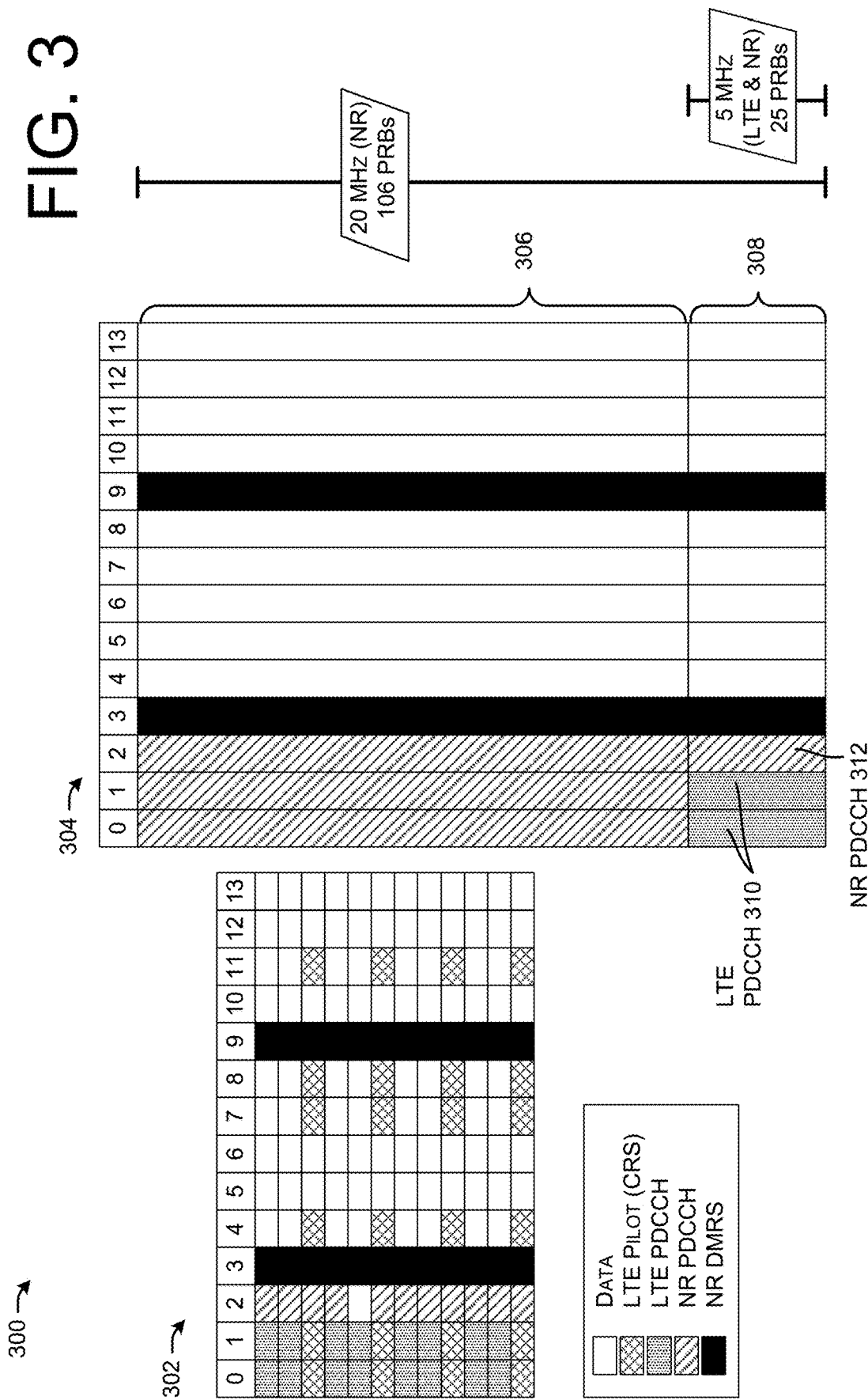
FIG. 3 illustrates additional example implementations of asymmetric dynamic spectrum, as described herein.

FIG. 3 illustrates an additional example 300 of asymmetric dynamic spectrum, as described herein.

A physical resource block (PRB) 302 illustrates transmission time interval (TTI) slots 0-13. A horizontal aspect of the PRB 302 represents time, while a vertical aspect of the PRB 302 represents a frequency range. Individual resource elements of the PRB 302 represent data, an LTE pilot (e.g., cell specific reference signal (CRS)), LTE PDCCH (physical downlink control channel), NR PDCCH, and NR DMRS (demodulation reference signal).

As illustrated in the PRB 302, a PRB configured for NR/LTE spectrum sharing may include NR and LTE control signals, which may reduce an amount of data capable of being transmitted in each PRB.

An example 304 represents various PRBs over a frequency spectrum configured for asymmetric dynamic spectrum sharing. For example, the example 304 illustrates a 20 MHz portion of spectrum whereby 15 MHz are allocated to NR only (e.g., a portion 306) while 5 MHz of the spectrum are allocated to spectrum sharing between NR and LTE (e.g., a portion 308). This 5 MHz portion 308 is illustrated as the lower elements including the LTE PDCCH portions 310 and the NR PDCCH 312. Of course, the example 304 is not limited to the size and configurations of the portions illustrated, and additional sizes and configurations are discussed herein (e.g., as discussed in connection with FIG. 2).

Further, the example 304 illustrates an increase in PDCCH capacity for data and/or voice for the NR communications in the portion 306 relative to the portion 308.

For example, techniques can include using Frequency division Multiplexing (FDM) for the PDCCH in ADSS to increase the capacity of NR PDCCH for services like VoNR (voice over NR).

Figure 4:
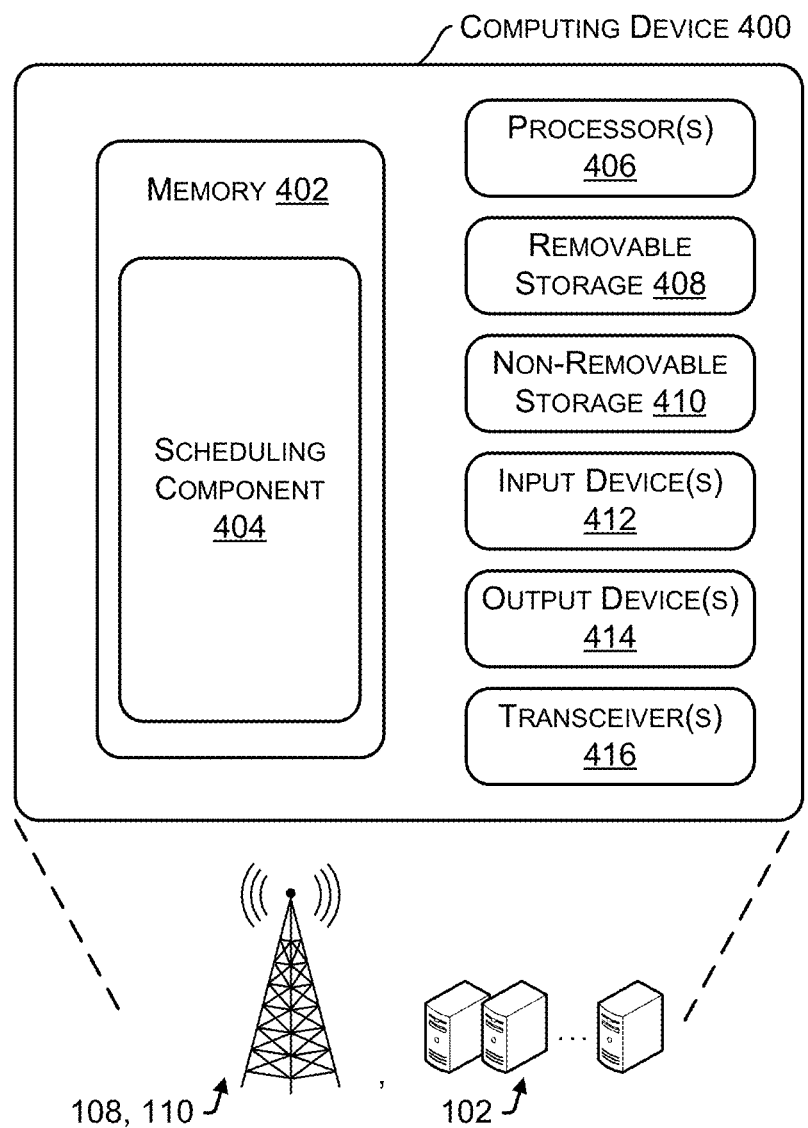
FIG. 4 illustrates an example computing device to implement the asymmetric dynamic spectrum sharing, as described herein.

FIG. 4 illustrates an example computing device to implement the asymmetric dynamic spectrum sharing, as described herein. In some embodiments, the computing device 400 can correspond to the base stations 108 or 110, the core network 102, and/or other components. It is to be understood in the context of this disclosure that the computing device 400 can be implemented as a single device, as a plurality of devices, or as a system with components and data distributed among them.

As illustrated, the computing device 400 comprises a memory 402 storing a scheduling component 404 to dynamically allocate/share spectrum based on network information and UE information, as discussed herein. Also, the computing device 400 includes processor(s) 406, a removable storage 408 and non-removable storage 410, input device(s) 412, output device(s) 414, and transceiver(s) 416.

In various embodiments, the memory 402 is volatile (such as RAM), non-volatile (such as ROM, flash memory, etc.) or some combination of the two. The scheduling component 404 stored in the memory 402 can comprise methods, threads, processes, applications or any other sort of executable instructions. The scheduling component 404 can also include files and databases.

For example, the scheduling component 404 can allocate spectrum based at least in part information that can include, but is not limited to: UE location information (e.g., GPS information, a beamforming lobe from a base station associated with the connection, information from other base stations to triangulate one or more UEs, etc.); signal information (e.g., a strength of the signal from one or more base stations, such as a downlink signal strength such as a received signal strength indication (RSSI), reference signal received power (RSRP), reference signal received quality (RSRQ), signal-to-interference-plus-noise ratio (SINR), etc.); attach status (e.g., a history of any successful/unsuccessful connections with one or more base stations); traffic type (e.g., associated with a UE communication, such as QCI, application type, voice or data traffic, latency requirements, bandwidth requirements, etc.); bandwidth metric(s); handover metric(s); heuristics; machine-learned algorithm(s); bearer type (e.g., indicative of a bearer type assigned to a UE); capability information (e.g., whether a UE is capable of dual connectivity and/or whether a UE is capable of communicating via the 5G protocol, a frequency range associated with one or more of a 4G capability or a 5G capability, etc.); and the like.

Additionally, the scheduling component 404 can allocate spectrum based at least in part on information that includes, but is not limited to: load information (e.g., a number of connections, available bandwidth, delay, queue size, jitter, etc. of the one or more base stations); beamforming information (e.g., indicative of individual beamforming lobe(s) associated with various UEs (e.g., indicative of location information)); profile information (e.g., a user profile based on an International Mobile Equipment Identity (IMEI), for example, received from various UEs, indicative of a subscriber level associated with UEs); attach status (e.g., a history of any successful/unsuccessful connections with one or more base stations); bearer type (e.g., indicative of a bearer type assigned to UEs); and the like.

As noted above, in some examples, the scheduling component 404 may allocate portion(s) of spectrum based at least in part on one or more machine learned algorithms and/or on one or more heuristics. In some examples, for example, a machine learned model can include weight(s) for various factors that can be used to set a size and/or position of spectrum to allocate to a single RAT, DSS, ADSS, and the like. Additionally or alternatively, a heuristic can determine a size of portion(s) to allocate in connection with ADSS based at least in part on a number of UEs configured for 4G, 5G, and/or DSS relative to one more thresholds. In some examples, the machine learned algorithm and/or heuristic can set portions for ADSS dynamically, statically, for a period of time, and the like. For example, a machine learned model or heuristic can determine a first configuration for ADSS based on first UE/network metrics for a first period of time and can determine a second configuration for ADSS based on second UE/network metrics for a second period of time.

In some embodiments, the processor(s) 406 is a central processing unit (CPU), a graphics processing unit (GPU), or both CPU and GPU, or other processing unit or component known in the art.

The computing device 400 also includes additional data storage devices (removable and/or non-removable) such as, for example, magnetic disks, optical disks, or tape. Such additional storage is illustrated in FIG. 4 by removable storage 48 and non-removable storage 410. Tangible computer-readable media can include volatile and non-volatile, removable and non-removable media implemented in any method or technology for storage of information, such as computer readable instructions, data structures, program modules, or other data. The memory 402, the removable storage 408 and the non-removable storage 410 are all examples of computer-readable storage media. Non-transitory computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the computing device 400. Any such tangible computer-readable media can be part of the computing device 400.

The computing device 400 may be configured to communicate over a telecommunications network using any common wireless and/or wired network access technology. Moreover, the computing device 400 may be configured to run any compatible device operating system (OS), including but not limited to, Microsoft Windows Mobile, Google Android, Apple iOS, Linux Mobile, as well as any other common mobile device OS.

The computing device 400 also can include input device(s) 412, such as a keypad, a cursor control, a touch-sensitive display, voice input device, etc., and output device(s) 414 such as a display, speakers, printers, etc. These devices are well known in the art and need not be discussed at length here.

As illustrated in FIG. 4, the computing device 400 also includes one or more wired or wireless transceiver(s) 416. For example, the transceiver(s) 418 can include a network interface card (NIC), a network adapter, a LAN adapter, or a physical, virtual, or logical address to connect to various networks, devices, or components illustrated in the network 100, for example. To increase throughput when exchanging wireless data, the transceiver(s) 416 can utilize multiple-input/multiple-output (MIMO) technology. The transceiver(s) 416 can comprise any sort of wireless transceivers capable of engaging in wireless, radio frequency (RF) communication. The transceiver(s) 416 can also include other wireless modems, such as a modem for engaging in Wi-Fi, WiMAX, Bluetooth, infrared communication, and the like.

Figure 5:
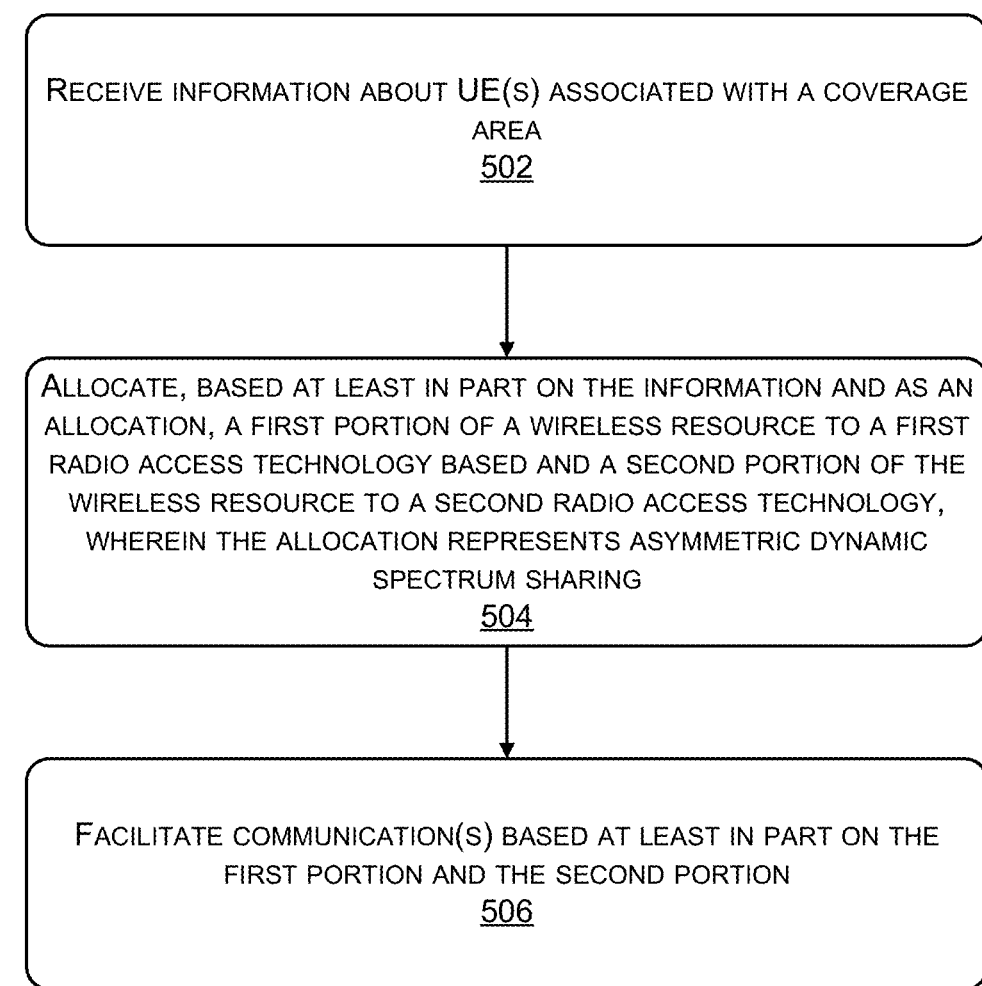
FIG. 5 illustrates an example process for asymmetric dynamic spectrum sharing, as described herein.

FIGS. 5 and 6 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

FIG. 5 illustrates an example process 500 for asymmetric dynamic spectrum sharing, as described herein. The example process 500 can be performed by the scheduling component 404 (or another component), in connection with other components and/or devices discussed herein. Some or all of the process 500 can be performed by one or more devices or components in the network 100, for example.

At operation 502, the process can include receiving information about UE(s) associated with a coverage area. For example, the operation 502 can include receiving capability information associated with the UEs (e.g., whether the UE is a 4G and/or 5G device, whether the device is capable of DSS, etc.), communication information (e.g., data requests, bandwidth information, load information, handover information, etc.), and the like. Examples of UE information and network information are discussed throughout this disclosure.

At operation 504, the process can include allocating, based at least in part on the information and as an allocation, a first portion of a wireless resource to a first radio access technology based and a second portion of the wireless resource to a second radio access technology, wherein the allocation represents asymmetric dynamic spectrum sharing. Examples of the ADSS are provided throughout this disclosure.

At operation 506, the process can include facilitating communication(s) based at least in part on the first portion and the second portion. For example, the operation 506 can include transmitting and/or receiving information at a base station based on the allocation determined herein. In some examples, the operation 506 can include sending one or more commands, messages, instructions, or data to one or more base stations (e.g., the base stations 108 and/or 110) to allocate spectrum according to the allocation as determined in the operation 504.

FIG. 6 illustrates another example process 600 for asymmetric dynamic spectrum sharing, as described herein. FIG. 6 represents an example architecture on the left of the figure with example operations on the right of the figure. The example process 600 can be performed by the UEs 112 and/or 114 (or another component), in connection with other components and/or devices discussed herein. Some or all of the process 600 can be performed by one or more devices or components in the network 100, for example.

At operation 602, the process can include sending UE capability information to base station(s). In some examples, the UE capability information can include, but is not limited to, NR/LTE capability, IMEI, UE make/model, UE software version, UE DSS capability, location information, communication type (e.g., voice, data, emergency, SMS/MMS), and the like. In some examples, the operation 602 may include sending information from which the UE capability information can be determined.

At operation 604, the process can include receiving signal(s) associated with an ADSS allocation. In this example, the ADSS configuration comprises the ADSS 122 allocation with 5 MHz of spectrum associated with LTE/NR DSS and 15 MHz of spectrum associated with a clean NR carrier, with a total NR carrier of 20 MHz.

At operation 606, the process can include determining whether a UE is a NR UE. In some examples this operation is implicit and may not be an express operation performed by a UE.

If the UE is not an NR UE, in this example the UE may be an LTE UE (e.g., the UE 112) and the process may continue to operation 608.

At operation 608, the process can include determining that a 5 MHz LTE carrier is available for communication. The process may continue at operation 610, where a UE may receive an allocation of spectrum within the 5 MHz LTE portion for a communication. The process may continue to operation 612, which may include communicating via the allocated portion(s).

If the UE is an NR UE ("yes" in the operation 606), the process may continue to operation 614 which may include determining that an NR carrier is available for communication. In some instances, the operation 614 may include a UE determining that a 20 MHz carrier is available for communication (regardless of UE configuration) and in some instances the operation 614 may include determining an availability of UE carrier based on a capability of the UE.

At operation 616, the process can include determining if the UE is a DSS capable UE. In some examples, this operation may be implicit and may not be an express operation performed by the UE. If the UE is not a DSS capable UE, the operation 618 can include receiving (e.g., at the UE) an allocation within a 15 MHz NR portion (e.g., the non-DSS 15 MHz portion).

If the UE is a DSS capable UE, the operation 616 may continue to operation 620, which may include receiving ADSS indication(s). In some examples, the operation 620 may include receiving a cell specific reference signal (CRS) rate matching or other explicit signaling (e.g., from a base station) indicating that sharing of LTE and NR is occurring within a portion of spectrum (e.g., 5 MHz in this example). In some examples, the CRS represents rate matching signaling that is use by the network (e.g., 100) to communicate the presence of ADSS/DSS in an environment.

At operation 622, the process may include receiving an allocation within a 20 MHz portion of spectrum (e.g., representing the 5 MHz DSS portion and the 15 MHz NR portion). In any event, the process may continue with the operation 612 with a UE communicating via the allocated portion(s).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
one or more non-transitory computer-readable media storing computer-executable that, when executed, cause the one or more processors to perform operations comprising:
receiving capability information associated with a plurality of user devices associated with a coverage area;
allocating, based at least in part on the capability information, a first portion of a wireless resource to a first radio access technology and a second radio access technology and a second portion of the wireless resource to the second radio access technology, wherein:
the first portion of the wireless resource includes first pilot signals associated with the first radio access technology and second pilot signals associated with the second radio access technology;
the second portion of the wireless resource includes the second pilot signals;
the first portion of the wireless resource is associated with a first portion of spectrum; and
the second portion of the wireless resource is associated with a second portion of spectrum that is asymmetric to the first portion of spectrum;
causing a first base station to transmit the first pilot signals associated with the first portion of the wireless resource; and
causing a second base station to transmit the second pilot signals associated with the first portion and the second portion of the wireless resource.

2. The system of claim 1, wherein:
the first radio access technology is Long Term Evolution (LTE); and
the second radio access technology is New Radio (NR).

3. The system of claim 1, wherein the capability information is indicative of:
a first number of the plurality of user devices that support the first radio access technology and the second radio access technology; and
a second number of the plurality of user devices that support dynamic spectrum sharing.

4. The system of claim 1, wherein a first size of the first portion is different than a second size of the second portion.

5. The system of claim 4, wherein:
the first portion of the wireless resource comprises 20 MHz of spectrum; and
the second portion of the wireless resource comprises 15 MHz of spectrum that is adjacent to and different from the first portion of the wireless resource.

6. The system of claim 1, the operations further comprising:
determining at least one of a bandwidth metric or a handover metric associated with the plurality of user devices; and
allocating the first portion and the second portion of the wireless resource based at least in part on the at least one of the bandwidth metric or the handover metric.

7. The system of claim 1, the operations further comprising:

wherein the capability information is first capability information associated with a first period of time, the operations further comprising:

determining second capability information associated with a second period of time after the first period of time; and allocating the wireless resource further based at least in part on the second capability information.

8. A method comprising:

receiving capability information associated with a plurality of user devices associated with a coverage area;

performing a first allocation, based at least in part on the capability information, of a first portion of a wireless resource to a first radio access technology and a second radio access technology and a second portion of the wireless resource to the second radio access technology, wherein a first size of the first portion has a first degree of asymmetry to a second size of the second portion;

causing a first base station to transmit with the first portion of the wireless resource;

causing a second base station to transmit with the first portion and the second portion of the wireless resource;

performing a second allocation, based at least in part on the capability information, of the first portion of the wireless resource to the first radio access technology and the second radio access technology and the second portion of the wireless resource to the second radio access technology, wherein, in response to the second allocation, the first size of the first portion has a second degree of asymmetry to the second size of the second portion, the first degree of asymmetry and the second degree of asymmetry being different;

causing the first base station to transmit with the first portion of the wireless resource; and causing the second base station to transmit with the first portion and the second portion of the wireless resource.

9. The method of claim 8, wherein:

the first radio access technology is Long Term Evolution (LTE); and the second radio access technology is New Radio (NR).

10. The method of claim 8, wherein the capability information is indicative of:

a first number of the plurality of user devices that support the first radio access technology and the second radio access technology; and a second number of the plurality of user devices that support dynamic spectrum sharing.

11. The method of claim 8, wherein:

the first portion of the wireless resource includes first pilot signals associated with the first radio access technology and second pilot signals associated with the second radio access technology; and the second portion of the wireless resource includes the second pilot signals.

12. The method of claim 11, wherein:

the first portion of the wireless resource comprises 20 MHz of spectrum; and the second portion of the wireless resource comprises 15 MHz of spectrum that is adjacent to and different from the first portion of the wireless resource.

13. The method of claim 8, further comprising:

determining at least one of a bandwidth metric or a handover metric associated with the plurality of user devices; and allocating the first portion and the second portion of the wireless resource based at least in part on the at least one of the bandwidth metric or the handover metric.

14. The method of claim 8, wherein the capability information is first capability information associated with a first period of time, the method further comprising:

determining second capability information associated with a second period of time after the first period of time; and allocating the wireless resource further based at least in part on the second capability information.

15. A method comprising:

receiving capability information associated with a plurality of user devices associated with a coverage area;

allocating, based at least in part on the capability information, a first portion of a wireless resource to a first radio access technology and a second radio access technology and a second portion of the wireless resource to the second radio access technology, wherein:

the first portion of the wireless resource includes first pilot signals associated with the first radio access technology and second pilot signals associated with the second radio access technology;

the second portion of the wireless resource includes the second pilot signals;

the first portion of the wireless resource is associated with a first portion of spectrum; and the second portion of the wireless resource is associated with a second portion of spectrum that is asymmetric to the first portion of spectrum;

causing a first base station to transmit the first pilot signals associated with the first portion of the wireless resource; and causing a second base station to transmit the second pilot signals associated with the first portion and the second portion of the wireless resource.

16. The method of claim 15, wherein:

the first radio access technology is Long Term Evolution (LTE); and the second radio access technology is New Radio (NR).

17. The method of claim 15, wherein the capability information is indicative of:

a first number of the plurality of user devices that support the first radio access technology and the second radio access technology; and a second number of the plurality of user devices that support dynamic spectrum sharing.

18. The method of claim 15, wherein a first size of the first portion is different than a second size of the second portion.

19. The method of claim 15, further comprising:

determining at least one of a bandwidth metric or a handover metric associated with the plurality of user devices; and allocating the first portion and the second portion of the wireless resource based at least in part on the at least one of the bandwidth metric or the handover metric.

20. The method of claim 15, wherein the capability information is first capability information associated with a first period of time, the method further comprising:

determining second capability information associated with a second period of time after the first period of time; and allocating the wireless resource further based at least in part on the second capability information.

* * * * *